United States Patent
Ma et al.

(10) Patent No.: US 7,609,831 B2
(45) Date of Patent: Oct. 27, 2009

(54) METHOD FOR IMPLEMENTING WIDE AREA CENTREX

(75) Inventors: Haiyin Ma, Guangdong (CN); Lizheng Cao, Guangdong (CN); Weijun Ma, Guangdong (CN); Sheng Yi, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 165 days.

(21) Appl. No.: 10/589,643

(22) PCT Filed: Jan. 23, 2006

(86) PCT No.: PCT/CN2006/000117

§ 371 (c)(1),
(2), (4) Date: May 22, 2007

(87) PCT Pub. No.: WO2006/076868

PCT Pub. Date: Jul. 27, 2006

(65) Prior Publication Data

US 2007/0286390 A1 Dec. 13, 2007

(30) Foreign Application Priority Data

Jan. 22, 2005 (CN) .......................... 2005-10032976

(51) Int. Cl.
*H04M 3/42* (2006.01)

(52) U.S. Cl. .............................. 379/211.01; 379/355.02; 379/229; 379/242; 455/432.1; 455/433; 455/414.1

(58) Field of Classification Search ............. 379/216.01, 379/230, 355.01, 355.04, 207, 112, 212, 379/220
See application file for complete search history.

(56) References Cited

U.S. PATENT DOCUMENTS

| 5,247,571 | A  | * | 9/1993  | Kay et al. | 379/221.09 |
| 5,892,821 | A  | * | 4/1999  | Turner | 379/221.08 |
| 6,668,052 | B2 | * | 12/2003 | Lampola | 379/230 |
| 2006/0062372 | A1 | * | 3/2006 | Lowmaster | 379/216.01 |

FOREIGN PATENT DOCUMENTS

| CA | 2174994 A1 | 12/1996 |
| CN | 1558685 A | 12/2004 |
| KR | 2002058807 A | 1/2002 |

* cited by examiner

*Primary Examiner*—Curtis Kuntz
*Assistant Examiner*—Phung-Hoang J Nguyen
(74) *Attorney, Agent, or Firm*—Conley Rose, P.C.; Grant Rodolph

(57) ABSTRACT

The present invention discloses a method for implementing Wide Area Centrex (WAC), wherein the long number and short number corresponding relationship of the WAC users is set and saved. The method includes: routing the call initiated by a user to a soft-switch; receiving by the soft-switch the call information the calling user sends; after determining that the calling user is a WAC user based on the calling number, the soft-switch determining the route to the called user based on the call information and completing the call. The WAC, covering the Public Switched Telephone Network (PSTN)/Public Land Mobile Network (PLMN) user and the Next Generation Network (NGN) user of different physical networks, can be implemented by using the method of the present invention without any software or hardware change to the switches in the existing network.

18 Claims, 7 Drawing Sheets

METHOD FOR IMPLEMENTING WIDE AREA CENTREX

FIELD OF THE INVENTION

The present invention relates to the technique of the switch in communication system, and particularly, to a method for implementing Wide Area Centrex.

BACKGROUND OF THE INVENTION

It is common knowledge that 80% of the income of telecommunication comes from 20% of the clients, namely the big clients. Now, the importance of the big clients to the operators is self-evident in the increasing telecommunication competition. The enterprises and big clients require high-standard quality of telecommunication services due to their special service needs, and the focus of competition among operators for attracting the big clients is to provide value-added services capable of bringing significant benefits to the big clients while satisfying the basic requirement of voice service and data service, and the Central Exchange (Centrex) service is one of the popular value-added services.

The so called Centrex service regards some aggregative users as a user group and provides the group with various service functions, such as calling each other in the group with short numbers. Herein, the short number is the number valid only in the group and usually has fewer digits. At present, however, the Centrex service provided by a stored-program control switch is only allowed to be used within the exchange. That is to say, extensions can call each other with short numbers only when they are in the same user group of one exchange. Users belonging to one aggregative client but covered by Centrex of different exchanges have to call each other with the uniform numbers in the Public Switched Telephone Network (PSTN), which is a long number.

However, users belonging to one aggregative client but covered by different exchanges may desire to call each other with short numbers as well. Then Wide Area Centrex (WAC) needs to be provided for the aggregative client. WAC is to combine the Centrex of different switch nodes into a virtual cross-region private network through physical and signaling connection. Though such a private network is dispersed in regions, it is similar to a single Centrex in performance and use. That is to say, WAC users also have two numbers: a long number and a short number. Besides the basic calling and complementary services of the PSTN, the users in the group can enjoy many special complementary services similar to those provided by a Private Automatic Branch Exchange (PABX), such as calling each other via short numbers within the group. Further, a telephonist can be configured in each group to assist out-group, into-group and in-group calling. A call center can also be established to assist the calling of many Centrex groups simultaneously.

WAC service can be implemented through the Intelligent Network(IN) in the prior art, namely the so called 600 service, in which multiple cities are covered by the intelligent network such that users could call each other with short numbers. Such a service is in fact a result of combining WAC and the Virtual Private Networking (VPN) of the IN service.

The structure of a WAC system implemented through the IN is illustrated in FIG. 1, including users 10, 11 and 12, Local Switch (LS) 22, Service Switch Point (SSP) 30, and Service Control Point (SCP) 40, wherein LS can be classified into two types, one is LS21 which supports attribute judgement and number transformation for WAC users, and the other is LS22 which does not support attribute judgement and number transformation for WAC users. In addition, SCP 40 includes the long number and short number corresponding table, which is used for saving the corresponding relationship between the long numbers and the short numbers of the WAC users.

The process of using LS21 which supports attribute judgment and number transformation for WAC users in the prior art is hereinafter described in detail: Provided that user 10, who has the short number 5001 and long number 5550888, wants to call a cross-region user 12 who has the short number 7001 and long number 7770888 in the same group. At this time, user 10 may dial the short number 7001 to LS21 directly. After LS21 finds that the short number is not a short number of its own exchange, it adds 600N1N2 before the short number automatically, which changes the short number into 600N1N2+7001, then directs and connects the 600 route to SSP 30. After detecting the intelligent call, SSP 30 reports the intelligent call to SCP 40. SCP 40 finds the long number being called is 7770888 based on the long number 5550888 of the calling and the short number 7001 of the called. Then, SCP 40 instructs SSP 30 to connect to the long number being called 7770888. Thereafter, the connecting process between SSP30 and the called is the same as an ordinary call.

The process of using LS 22 which does not support attribute judgment and number transformation for WAC users in the prior art is as follows: Provided that user 11, who has the short number 6001 and long number 6660888, wants to call a cross-region user 12 who has the short number 7001 and long number 7770888 in the same group. At this time, user 11 needs to dial 600N1N2+7001 to LS 22, then LS 22 directs and connects the 600 route to SSP 30. Thereafter, the process is the same as above.

Besides being implemented by using the IN, WAC can be implemented by the method of distributed number memorization and transformation. In such a case, the inter-exchange relay signaling of the LS is the Integrated Services Digital Network (ISDN) User Part (ISUP) while the inter-exchange support for the extended Signaling Connection Control Part (SCCP) is required. As shown in FIG. 2, suppose that WAC is configured for two LS, every LS uses the switch of Internet Service Provider (ISP) board, and all the long number and short number corresponding tables of the WAC users in the group are saved in the switches used. The switches set up the communication path of SCCP via the PSTN. When an in-group call is made, the number of the group and the short number are sent to the ISP to inquire about the corresponding long number. The inquired long number may be the number of the same exchange or that of another exchange, and an in-exchange call or a cross-exchange call is implemented after an analysis of the long number. Herein, route data of the Message Transfer Part (MTP) ,which enable the telephone station to conduct cross-switch management of the data of the WAC users in the group and obtain phone bills across exchange by means of SCCP signaling ,are configured between the LS,.

In such a manner of implementation, the user data of each LS in the WAC need to be maintained and synchronized. The specific process of the data maintenance is as follows: When the user data in the WAC group are revised by a Background Administration Module (BAM) of a switch of an LS exchange and the WAC telephone station, the long number and short number corresponding table of the WAC group on the ISP board of the LS is revised. Meanwhile, the long number and short number corresponding tables relating to the WAC group on the ISP boards of other exchange are also revised through SCCP signaling so as to implement automatic cross-exchange user data maintenance. The specific process of the data synchronization is as follows: The long number and short number corresponding table of the WAC group on the ISP board will trigger the function of synchronized checking manually or periodically, which compares the long number and short number corresponding table with those saved in other exchanges within the WAC group to determine whether the tables are the same. If the tables are not the same, synchronized revision is performed, respectively, according to the data of the exchange to which the user belongs.

At present, WAC service can already be provided for users of PSTN, Public Lands Mobile Network (PLMN), and Next Generation Network (NGN) simultaneously.

SUMMARY OF THE INVENTION

In practical use the first method, in which the long number and short number transformation is implemented through the IN, needs to save data and consume a great deal of resources in the intelligent SCP, resulting in heavy workload and high cost. The second method requires the existing switches to extend the ISUP interfaces, and corresponding data must be configured in all the switches, which involves changes to the switches of different manufacturers and different versions in the network, making quick implementation and wide application thereof difficult.

The reason for this situation is mainly that both methods require a lot of changes to the existing network without making full use of the techniques and facilities of the existing network.

In view of the above, this invention provides a method for implementing Wide Area Centrex (WAC), in which the WAC covering the PSTN/PLMN users and the NGN users of different physical networks, is implemented without the need for any software or hardware changes to the switches in the existing network, wherein the corresponding relationship between long numbers and short numbers of WAC users is set and saved, and the method includes:

routing a call initiated by a calling user to a soft-switch, receiving by the soft-switch the call information initiated by the calling user, determining, based on the calling number, that the calling user is a WAC user before deciding the route to the called user based on the call information and completing the call.

When the calling WAC user is a NGN user and the called WAC user is a PSTN/PLMN user; the step of routing the call initiated by a user to the soft-switch is that the NGN user dials the short number of the called user, and initiates the call to the soft-switch; the step of receiving by the soft-switch the call information the calling user initiates is that the soft-switch directly receives the short number of the called user which the NGN user dials; and the step of determining the route to the called user and completing the call is that the soft-switch starts its own analysis of Centrex numbers, obtains the long number of the called user according to the saved corresponding relationship between long numbers and short numbers, routes the call to the LS to which the called user belongs according to the obtained long number and completes the call.

When the calling WAC user is a PSTN/PLMN user; the step of routing the call initiated by a user to the soft-switch is that the PSTN/PLMN user dials the out-group prefix of the WAC, and the call is routed to the soft-switch after the LS to which the PSTN/PLMN user belongs checks and determines that the out-group prefix is the out-group prefix of the WAC; the step of receiving by the soft-switch the call information the calling user initiates is that the soft-switch receives the out-group prefix the LS sends; the step of determining the route to the called user and completing the call is that the soft-switch obtains the data of the Centrex according to the calling number, starts its own analysis of Centrex numbers to determine that the call is an out-group call, deletes the out-group prefix and starts the process of handling an out-group call of the IP Centrex service.

When the calling WAC user is a PSTN/PLMN user; the step of routing the call initiated by a user to the soft-switch is that the PSTN/PLMN user dials the long number of the called user, and the call is routed to the soft-switch by the LS to which the PSTN/PLMN user belongs according to the pre-planned routing data; the step of receiving by the soft-switch the call information the calling user sends is that the soft-switch receives the long number of the called which the LS sends; the step of determining the route to the called user and completing the call is that the soft-switch gets the data of the Centrex according to the calling number, starts its own analysis of Centrex numbers to determine that the call is an out-group call, and then starts the process of handling an out-group call of the IP Centrex service.

When the corresponding relationship of long number and short number of the WAC users is saved in the long number and short number corresponding table, wherein the long number and short number corresponding table is saved in the soft-switch, or saved in the peripherals of the soft-switch. Alternatively, the corresponding table is saved in a remote database, and then the method further includes: the soft-switch accessing the remote database directly or via proxy. Herein, the proxy is the local database.

The method further includes that the switches belonging to the same WAC service group determine the short number prefix and the out-group prefix of the WAC group through negotiation.

The main difference between the methods of the present invention and the prior art can be found by comparison: the WAC is implemented based on the soft-switch in the present invention, wherein the long number and short number corresponding table of the WAC is saved in the soft-switch or an external database it can access. Both the call of a PSTN/PLMN user and that of a NGN user in the group are routed to the soft-switch. The long number and short number transformation is performed according to the long number and short number corresponding table after an analysis of the calling number, and the call is routed to the called user according to the result of the transformation.

Such a difference between the methods brings apparent benefits, namely the soft-switch can be connected to the switches in the existing network by using the standard ISUP/Telephone User Part (TUP) protocol because the long number and short number transformation is performed in the soft-switch. So no development and upgrading of the existing switches are needed for implementing the WAC service. Furthermore, the method of this invention based on soft-switch makes a full use of the process for handling a call of the IP Centrex, having less impact on the existing network while achieving high efficiency.

DETAILED DESCRIPTION OF PREFERRED EMBODIMENTS

To make the method and advantages of the present invention more apparent, the present invention will hereinafter be described in detail according to the accompanying drawings.

First, the NGN IP Centrex service will be described. The NGN IP Centrex service is a Centrex service built on a soft-switch system. Soft-switch is the core equipment used for dealing with call signaling, performing call control and implementing service in the NGN. Compared with the Centrex service provided by the traditional PSTN switch, new properties are added to the Centrex service provided by the system of soft-switch because the bearer of the system of soft-switch is a wideband IP data network. The user in a NGN IP Centrex group can be all kinds of users, such as ordinary users of voice service, multimedia users and etc. within the soft-switch domain, or PSTN/PLMN users connected with the soft-switch domain.

The basic principle of the present invention is: the WAC long number and short number corresponding table is saved in a place where the soft-switch can access; calls of the WAC users from PSTN/PLMN and NGN are all routed to the soft-switch, and whether the procedure for handling a WAC call is started or not is determined by recognizing the number of the calling; if it is determined to start the procedure, the function of long number and short number transformation, the function of number analysis and the function of call routing are performed. The WAC long number and short number corresponding table can be put in the soft-switch directly, or in the peripherals of the soft-switch, or in a remote database which the soft-switch can access via proxy.

Hereinafter, the implementation of the WAC service covering PSTN/PLMN users and NGN users will be described with reference to FIG. 3.

Figure 1:
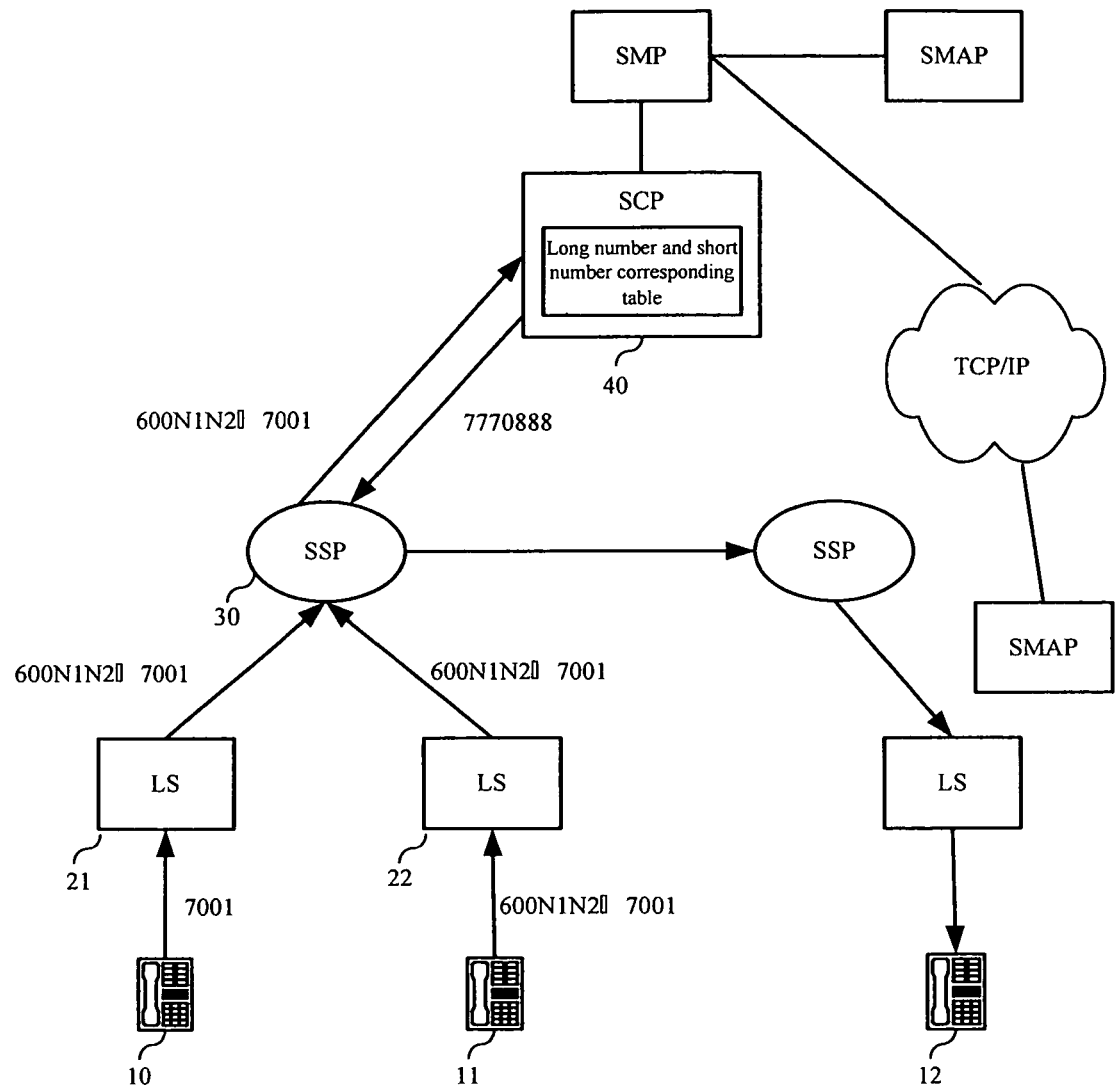
FIG. 1 shows the structure for implementing WAC through the IN of the prior art.
Figure 2:
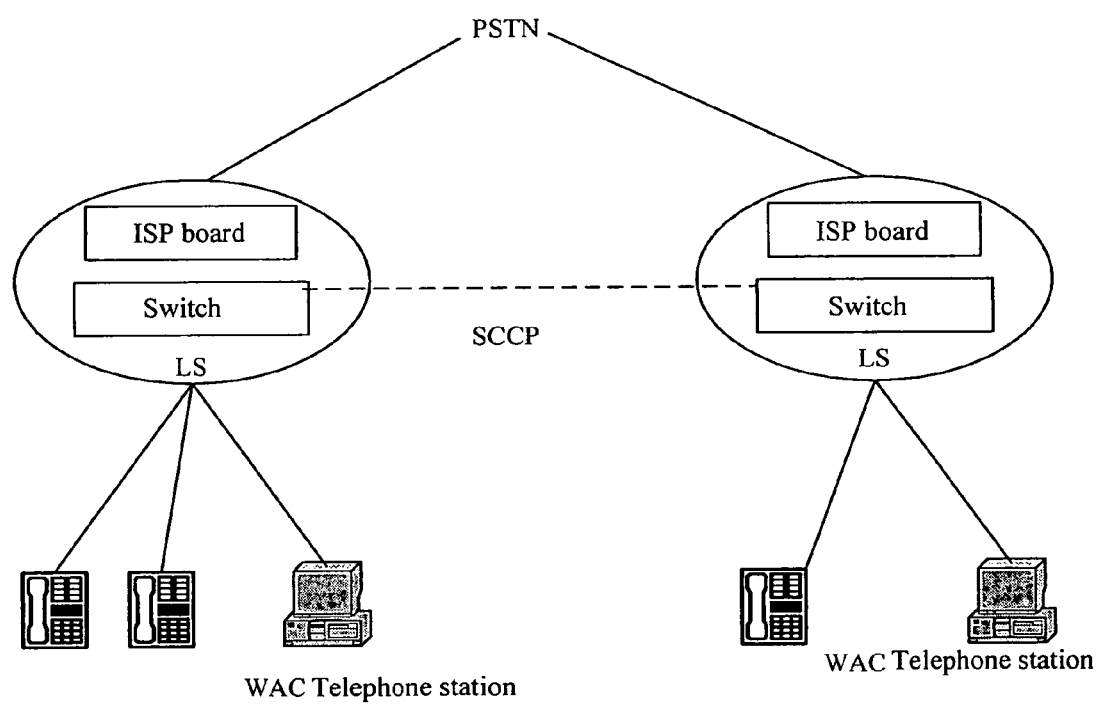
FIG. 2 shows the structure for implementing WAC through distributed number memorization and transformation in the prior art.
Figure 3:
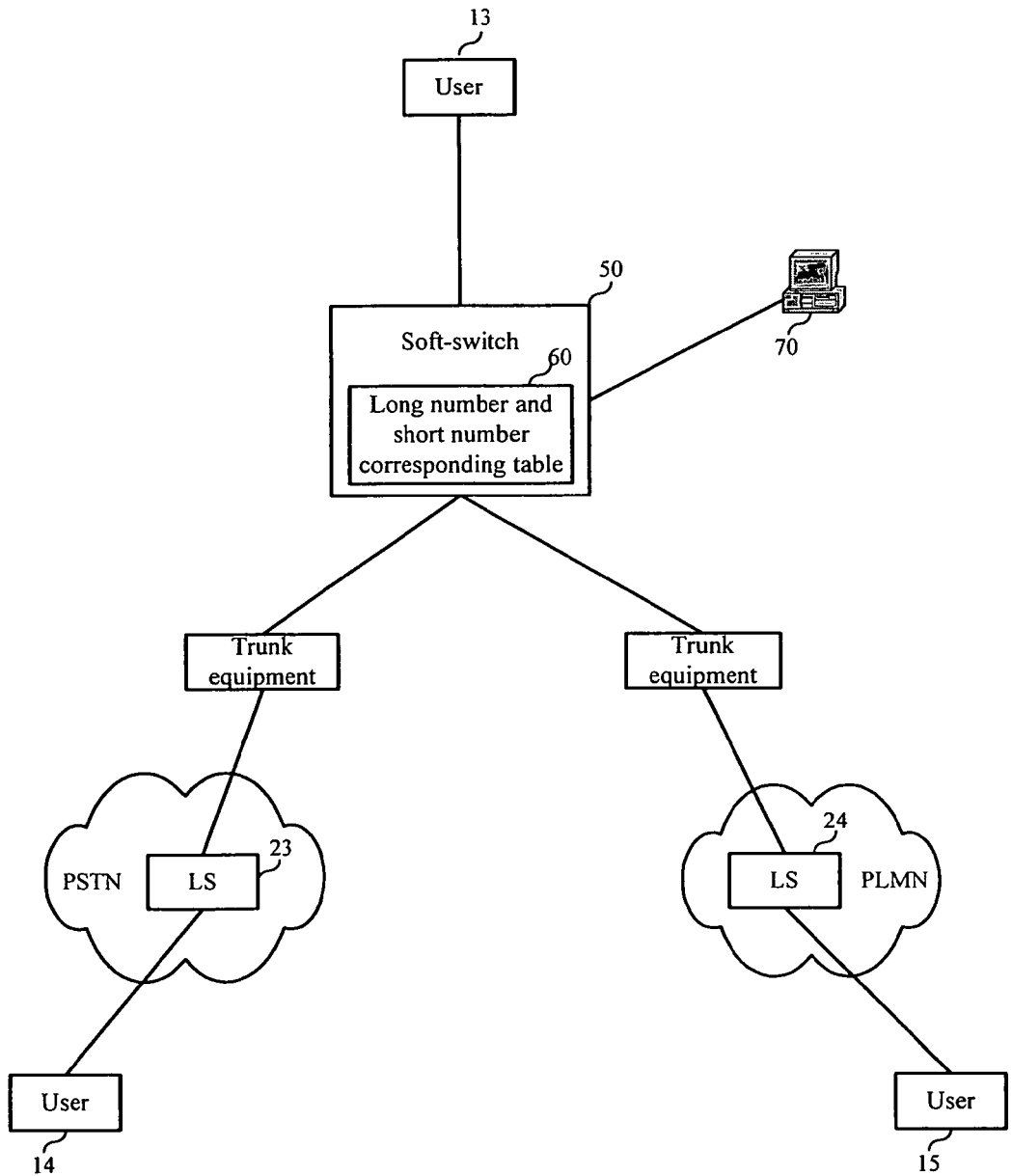
FIG. 3 is a schematic showing the structure for implementing WAC covering PSTN/PLMN users and NGN users in accordance with an embodiment of the present invention.

As shown in FIG. 3, the long number and short number corresponding table 60 covering PSTN/PLMN users and NGN users is embedded in soft-switch 50 in the NGN; LS23 of the PSTN domain and LS24 of the PLMN domain are connected to soft-switch 50 by means of trunk equipment, respectively; besides, WAC telephone station 70 used for uniformly maintaining the data of the group is also connected to soft-switch 50; user 13 is a WAC user of the NGN domain, user 14 is a WAC user of the PSTN domain, and user 15 is a WAC user of the PLMN domain.

When implementing WAC based on soft-switch 50, the calls of NGN users in the same WAC group are handled as ordinary IP Centrex call without modification, because the call control and service implementation of calls from NGN users are originally performed by soft-switch 50. As far as PSTN/PLMN users in the WAC group are concerned, no hardware or software change to the relevant LS is needed while it is only needed to route the calls of WAC users to soft-switch 50 by means of data configuration. Calls from PSTN/PLMN users within a WAC group are mainly divided into 3 types: the short number Centrex call in the group, the Centrex call with out-group prefix, and the ordinary call. After soft-switch 50 determines that the call is a call from a PSTN/PLMN user in the WAC group through the process of recognizing the group of the calling, the call will be handled according to the uniform procedure of handling an ordinary IP Centrex call, thus making a full use of the existing IP Centrex procedure.

Procedures of various services are described in detail hereinafter.

The procedure of a NGN user in the WAC group calling a NGN user in the same WAC group: use the existing procedure for handling a call in IP Centrex service.

The procedure of a NGN user in the WAC group calling a NGN user who is not in the same WAC group: use the existing procedure for handling a call in IP Centrex service.

The procedure of a NGN user in the WAC group dialing an out-group prefix to call a PSTN/PLMN user: use the existing procedure for handling an out-group call in IP Centrex service.

Figure 4:
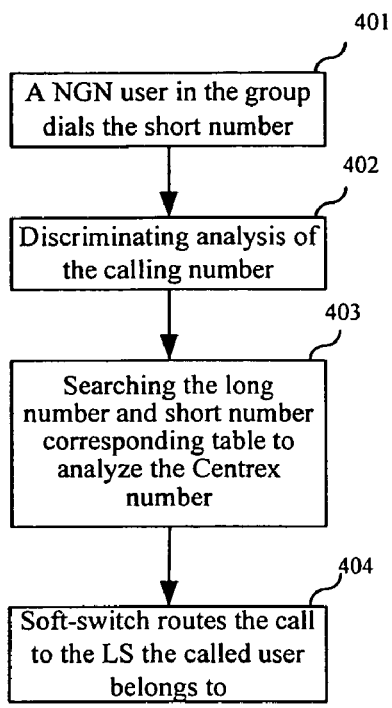
FIG. 4 is a flow chart of a NGN user in the WAC group dialing short number to call a PSTN/PLMN user in the group in accordance with an embodiment of the present invention.

The procedure of a NGN user in the WAC group dialing a short number to call a PSTN/PLMN user in the same WAC group includes the following steps as shown in FIG. 4:

Step 401: The NGN user in the WAC group takes up the telephone and dials the short number of a PSTN or PLPM user within the group, sending a call to the soft-switch. Herein, the NGN user is the calling user and the PSTN or PLMN user is the called user.

Step 402: Soft-switch 50 finds the call is an in-group call sent from a WAC user by the process of analyzing and recognizing the calling number in itself after receiving the short number the NGN user has dialed.

Step 403: Soft-switch 50 starts its own Centrex number analysis, searching the long number and short number corresponding table 60 saved in itself to get the long number of the called PSTN or PLMN user.

Step 404: After the long number is obtained, soft-switch 50 routes the call to the LS to which the called PSTN/PLMN user belongs according to the obtained long number to complete the call.

Figure 5:
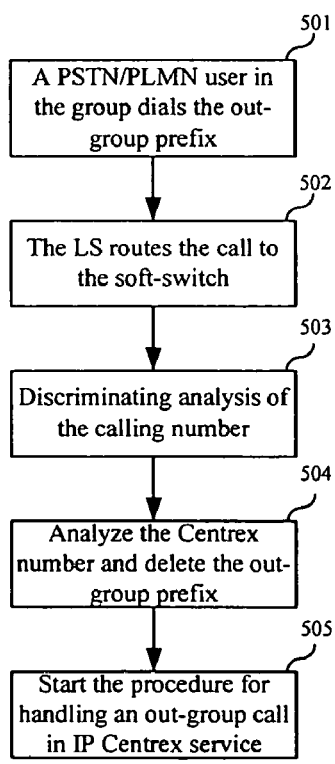
FIG. 5 is a flow chart of a PSTN/PLMN user in the WAC group dialing an out-group prefix to call a PSTN/PLMN user or a NGN user in accordance with an embodiment of the present invention.

The procedure of a PSTN/PLMN user in the WAC group dialing the out-group prefix to call a PSTN/PLMN user or a NGN user includes the following steps as shown in FIG. 5:

Step 501: The PSTN/PLMN user in the WAC group takes up the telephone and dials the out-group prefix of the WAC.

Step 502: The LS to which the PSTN/PLMN user in the WAC group belongs detects that the called prefix is an out-group prefix of a call in the WAC, and routes the call to soft-switch 50.

Step 503: Soft-switch 50 determines that the call is a call sent from a PSTN/PLMN user of the WAC by the process of analyzing and recognizing the calling number, and gets the relevant data of the Centrex user.

Step 504: Soft-switch 50 starts its own procedure of Centrex number analysis according to the called prefix received, and finds that this is an out-group call with the out-group prefix, then deletes the out-group prefix.

Step 505: Soft-switch 50 starts the process for handling an out-group call in IP Centrex service.

It should be noted here that the switches in the same WAC group need to determine the short-number prefix and the out-group prefix of the WAC group through negotiation. Herein, the short-number prefix of the group means the prefix of the short number of the WAC users, and generally speaking, it is used in number analysis when the user calls or the user is called.

Figure 6:
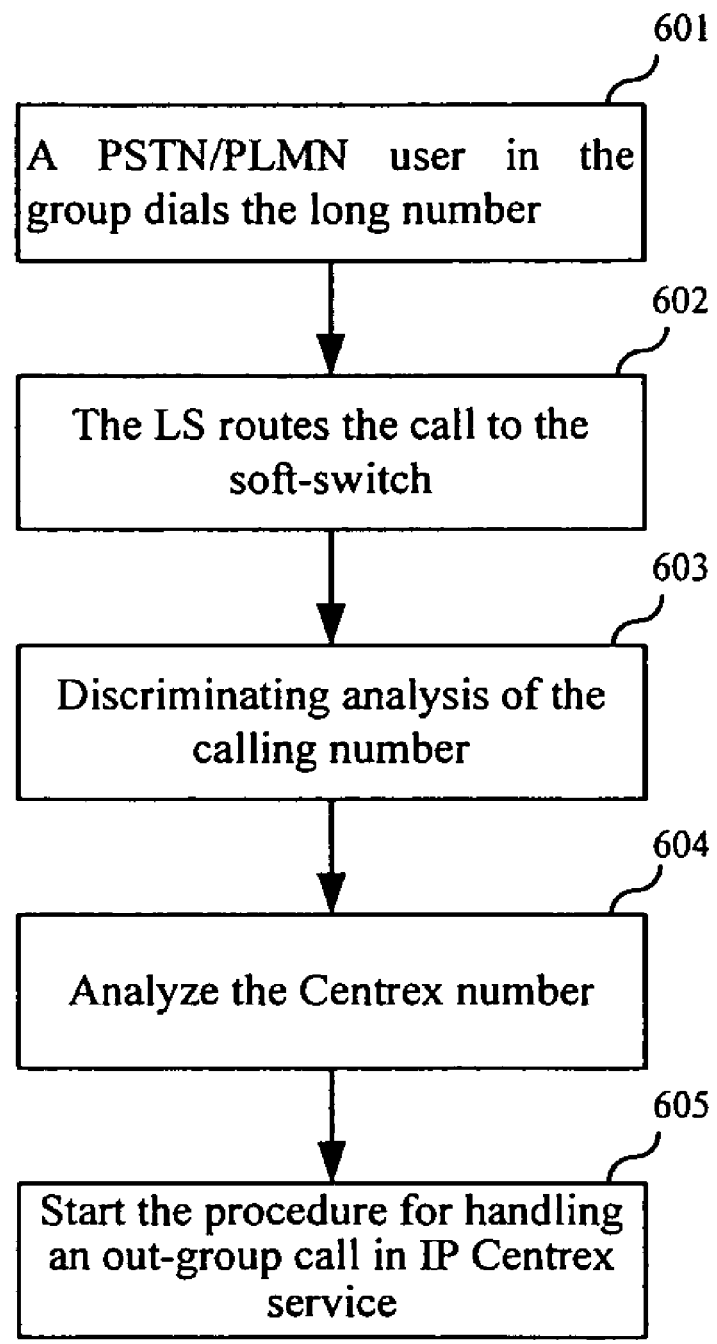
FIG. 6 is a flow chart of a PSTN/PLMN user in the WAC group calling a PSTN/PLMN user or a NGN user directly in accordance with an embodiment of the present invention.

The procedure of a PSTN/PLMN user in the WAC group calling a PSTN/PLMN user or a NGN user directly is shown in FIG. 6:

Step 601: The PSTN/PLMN user in the WAC group takes up the telephone and dials the long number of the PSTN/PLMN user or the NGN user.

Step 602: The LS to which the PSTN/PLMN user in the WAC group belongs routes the call to soft-switch 50 according to the pre-configured routing data.

Step 603: Soft-switch 50 determines that the call is a call sent from a PSTN/PLMN user of the WAC by the analyzing process to recognize the calling number, and gets the relevant data of the Centrex user.

Step 604: Soft-switch 50 starts its own Centrex number analyzing procedure according to the called prefix received, and finds that this is an out-group call with out-group prefix. This step is different from Step 504 in that the out-group prefix need not be deleted.

Step 605: Soft-switch 50 starts the procedure for handling an out-group call in IP Centrex service.

In addition, there can be the following substitutions of the above-mentioned modes of implementation.

Figure 7:
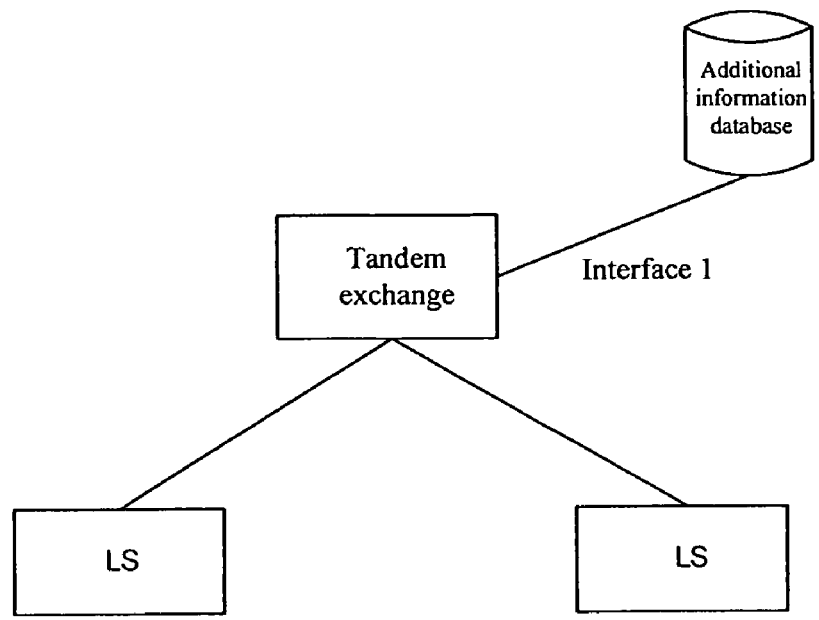
FIG. 7 is a schematic of adopting an external additional information database in an embodiment of the present invention.

One substitution is: the long number and short number corresponding table is not saved in the soft-switch but in the peripherals of the soft-switch. As shown in FIG. 7, the long number and short number corresponding table is saved in the additional information database in a preferred embodiment of the present invention. The additional information database is connected with the junction tandem exchange through Interface 1 and the additional information database in the present embodiment is a local database. The soft-switch is used as a transit exchange in the embodiment as shown in FIG. 7.

Figure 8:
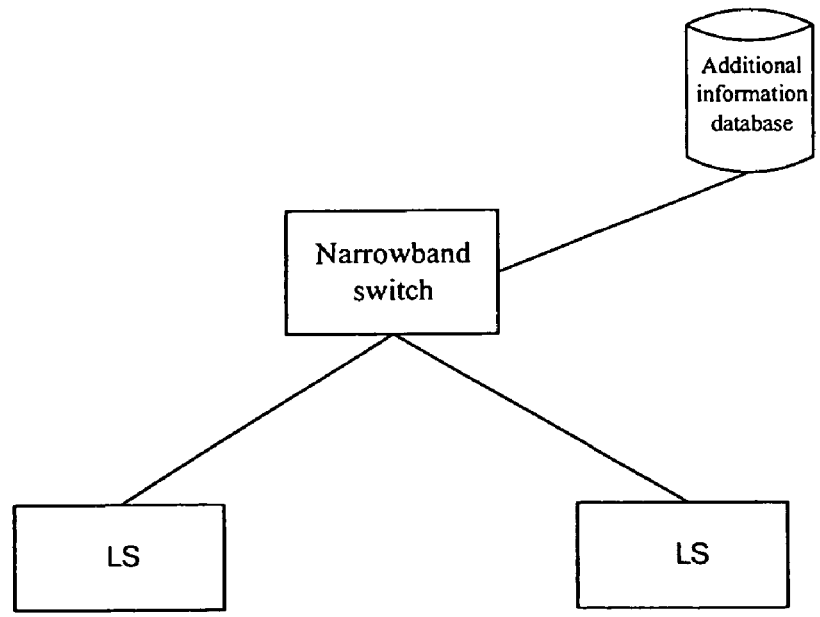
FIG. 8 is a schematic of adopting a narrowband switch instead of the soft-switch in an embodiment of the present invention.

Another substitution is: the narrowband switch in the existing network is used instead of the soft-switch to realize WAC. In a preferred embodiment of the present invention as shown in FIG. 8, a network node composed of the narrowband switch in the existing network instead of the soft-switch is connected with the LS, and the narrowband switch is also connected with an additional information database. The long number and short number corresponding table is saved in the additional information database and the additional information database in the present embodiment is a local database.

Figure 9:
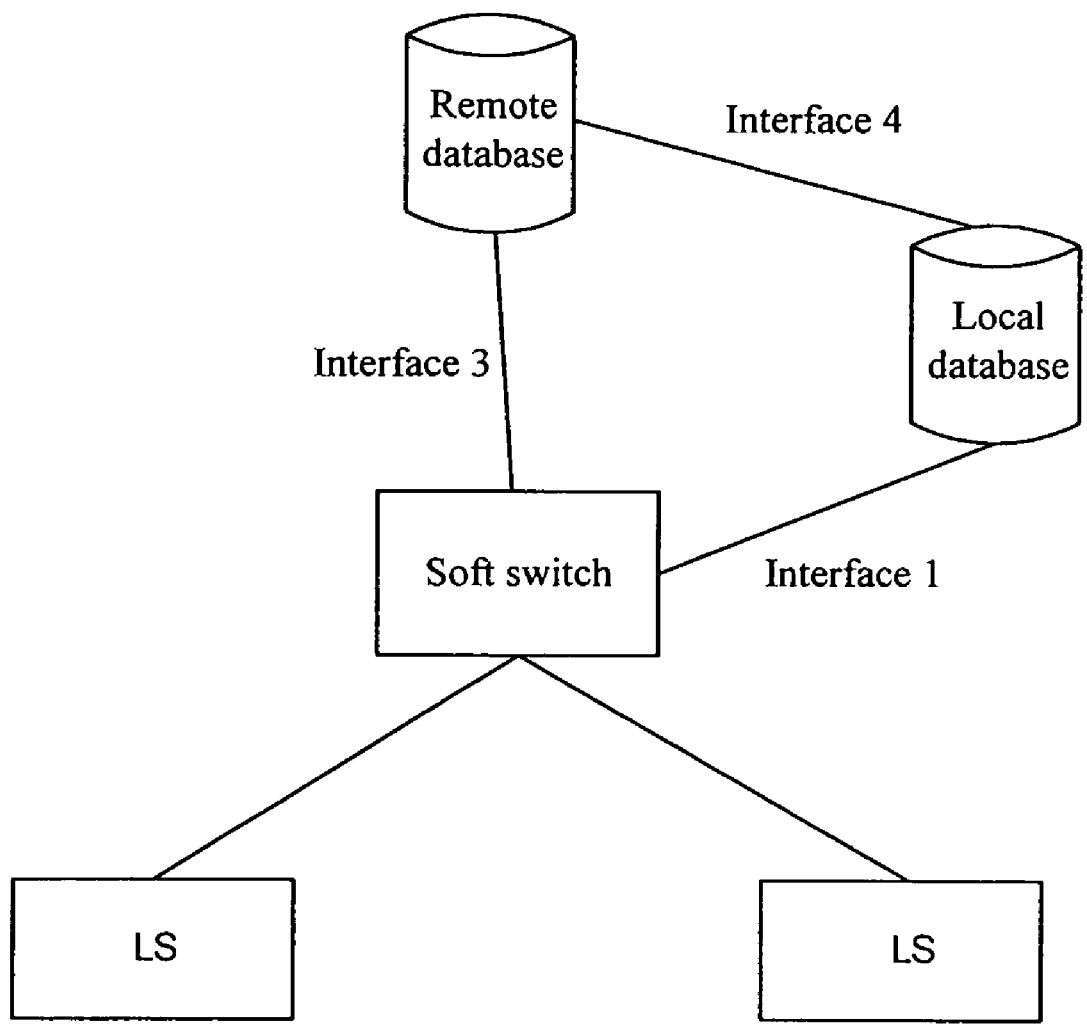
FIG. 9 is a schematic of using a local database and a remote database in an embodiment of the present invention.

Yet another substitute method as shown in FIG. 9 is: when the long number and short number corresponding table is not found in the local database, the soft-switch can access a remote database directly through Interface 3, or access the cross-region database via the local database through Interface 4. When Interface 4 is adopted, the local database acts as a proxy to search and obtain the additional information of the calling from the remote database, then passes the search result to the switch. Herein, both the local database and the remote database are the additional information database in which the long number and short number corresponding table is saved.

In the above three substitutions, Interface 1, Interface 3 and Interface 4 use standard interface in general. Obviously, the interface standard agreed by both sides through negotiation can also be used as long as information interaction can be implemented between the two sides.

Although the present invention has been illustrated and described according to preferred embodiments, it is apparent to those skilled in the art that there can be various changes in form and details, without departing from the scope and spirit of the invention as defined in the appended claims.

The invention claimed is:

1. A method for implementing Wide Area Centrex (WAC), wherein a corresponding relationship between long number and short number of the WAC users is set and saved, the method comprising:

routing a call a calling user initiates to a soft-switch;

receiving by the soft-switch call information the calling user initiates and determining that the calling user is a WAC user by analyzing and recognizing a calling number;

determining a route by the soft-switch to a called WAC user based on the call information and completing the call;

wherein the WAC is implemented by trunk equipment, when said calling user is a Public Switched Telephone Network (PSTN) or Public Land Mobile Network (PLMN) user; and the step of routing the call the calling user initiates to the soft-switch comprises: the PSTN or PLMN user dialing an out-group prefix of the WAC or a long number of the called user, and a Local Switch (LS) to which the PSTN or PLMN user belongs routing the call to the soft-switch;

the step of the soft-switch receiving the call information the calling user sends comprises: the soft-switch receiving the out-group prefix or the called long number that the LS sends;

the step of determining the route by the soft-switch to the called user and completing the call comprises: the soft-switch obtaining the data of the Centrex according to the calling number, starting its own analysis of Centex numbers to determine that the call is an out-group call, and starting the procedure for handling an out-group call in IP Centrex service;

wherein the WAC implemented by means of trunk equipment refers to routing the call the calling user initiates by the LS to which the PSTN or PLMN user belongs to the soft-switch by means of the trunk equipment.

2. The method according to claim 1, wherein when said calling WAC user is a Next Generation Network (NGN) user and said called WAC user is a PSTN or PLMN user;

the step of routing the call the calling user initiates to the soft-switch comprises: the NGN user dialing a short number of the called user, and initiating the call to the soft-switch;

the step of receiving by the soft-switch the call information the calling user initiates comprises: the soft-switch receiving the short number of the called user that the NGN user dials;

the step of determining the route by the soft-switch to the called user and completing the call comprises: the soft-switch starting its own analysis of Central Exchange (Centrex) numbers, obtaining the long number of the called user according to the saved long number and short number corresponding relationship, and routing the call to a LS to which the called user belongs according to the obtained long number and completing the call;

wherein the WAC is implemented by means of trunk equipment refers to routing the call by the soft-switch to the LS to which the called user belongs by means of the trunk equipment.

3. The method according to claim 2, wherein the long number and short number corresponding relationship of the WAC users is saved in a long number and short number corresponding table.

4. The method according to claim 2, further comprising: the switches belonging to the same WAC service group determining the short number prefix and the out-group prefix of the WAC group through negotiation.

5. The method according to claim 1, wherein the long number and short number corresponding relationship of the WAC users is saved in a long number and short number corresponding table.

6. The method according to claim 5, wherein the long number and short number corresponding table is saved in the soft-switch.

7. The method according to claim 1, further comprising:
the switches belonging to the same WAC service group determining the short number prefix and the out-group prefix of the WAC group through negotiation.

8. The method according to claim 1, wherein the long number and short number corresponding relationship of the WAC users is saved in a long number and short number corresponding table.

9. The method according to claim 1 wherein the long number and short number corresponding relationship of the WAC users is saved in a long number and short number corresponding table.

10. The method according to claim 1, wherein when the PSTN or PLMN user dialing the out-group prefix of the WAC, the step of routing the call the calling user initiates to the soft-switch further comprises:
the LS to which the PSTN or PLMN user belongs routing the call to the soft-switch after the LS determining through detection that the out-group prefix is the out-group call prefix of the WAC; and before starting the procedure for handling the out-group call in IP Centrex service, the method further comprises:
deleting the out-group prefix.

11. The method according to claim 10, wherein the long number and short number corresponding relationship of the WAC users is saved in a long number and short number corresponding table.

12. The method according to claim 10, further comprising: the switches belonging to the same WAC service group determining the short number prefix and the out-group prefix of the WAC group through negotiation.

13. The method according to claim 1, wherein when the PSTN or PLMN user dialing the long number of the called user, the step of routing the call the calling user initiates to the soft-switch further comprises:
the LS to which the PSTN or PLMN user belongs routing the call to the soft-switch according to a pre-configured forting data.

14. The method according to claim 13, wherein the long number and short number corresponding relationship of the WAC users is saved in a long number and short number corresponding table.

15. The method according to claim 14, wherein the proxy is a local database.

16. The method according to claim 13, further comprising: the switches belonging to the same WAC service group determining the short number prefix and the out-group prefix of the WAC group through negotiation.

17. A soft-switch, configured to implement a method comprising:
receiving call information a calling user initiates and determining that the calling user is a Wide Area Centrex (WAC) user by analyzing and recognizing a calling number;
determining a route to a called WAC user based on the call information and completing the call;
wherein a corresponding relationship between long number and short number of the WAC users is set and saved, when said calling user is a Public Switched Telephone Network (PSTN) or Public Land Mobile Network (PLMN) user, the soft-switch is further configured to implement the method comprising:
receiving an out-group prefix or a called long number that a Local Switch (LS) to which the PSTN or PLMN user belongs sends;
obtaining the data of the Centrex according to the calling number, starting the soft-switch's own analysis of Centrex numbers to determine that the call is an out-group call, and starting the procedure for handling an out-group call in IP Centrex service.

18. The soft-switch according to claim 17, wherein when the soft-switch receives the out-group prefix that the LS to which the PSTN or PLMN user belongs sends, the soft-switch is further configured to implement the method comprising: deleting the out-group prefix before starting the procedure for handling the out-group call in IP Centrex service.

* * * * *

UNITED STATES PATENT AND TRADEMARK OFFICE
CERTIFICATE OF CORRECTION

| | | |
|---|---|---|
| PATENT NO. | : 7,609,831 B2 | Page 1 of 1 |
| APPLICATION NO. | : 10/589643 | |
| DATED | : October 27, 2009 | |
| INVENTOR(S) | : Haiyin Ma et al. | |

It is certified that error appears in the above-identified patent and that said Letters Patent is hereby corrected as shown below:

Column 9, line 37, replace the text "claim 1" with the text "claim 2".

Column 9, line 43, replace the text "forting" with the text "routing".

Signed and Sealed this

Fifteenth Day of February, 2011

David J. Kappos
*Director of the United States Patent and Trademark Office*